(12) United States Patent
Wolmuth

(10) Patent No.: US 8,107,602 B2
(45) Date of Patent: Jan. 31, 2012

(54) DIRECTORY ASSISTANCE WITH DATA PROCESSING STATION

(75) Inventor: Scott Wolmuth, Santa Rosa, CA (US)

(73) Assignee: Jingle Networks, Inc., Bedford, MA (US)

( * ) Notice: Subject to any disclaimer, the term of this patent is extended or adjusted under 35 U.S.C. 154(b) by 342 days.

(21) Appl. No.: 11/897,262

(22) Filed: Aug. 29, 2007

(65) Prior Publication Data

US 2008/0081661 A1    Apr. 3, 2008

Related U.S. Application Data

(63) Continuation of application No. 11/728,189, filed on Mar. 23, 2007, which is a continuation of application No. 10/063,990, filed on May 31, 2002, now Pat. No. 7,212,615.

(51) Int. Cl.
    *H04M 1/64* (2006.01)
(52) U.S. Cl. ............ 379/88.22; 379/93.12; 379/114.05; 379/114.1; 379/114.11; 379/114.12; 379/114.13
(58) Field of Classification Search ............... 379/88.22, 379/93.12, 114.05, 114.1, 114.11, 114.12, 379/114.13
    See application file for complete search history.

(56) References Cited

U.S. PATENT DOCUMENTS

| | | |
|---|---|---|
| 4,193,113 A | 3/1980 | Cykowski |
| 4,839,919 A | 6/1989 | Borges |
| 4,850,007 A | 7/1989 | Marino et al. |
| 4,943,995 A | 7/1990 | Daudelin |
| 5,187,735 A | 2/1993 | Herrero Garcia et al. |
| 5,222,120 A | 6/1993 | McLeod et al. |
| 5,321,740 A | 6/1994 | Gregorek et al. |
| 5,339,352 A | 8/1994 | Armstrong et al. |
| 5,361,295 A | 11/1994 | Solomon et al. |
| 5,444,713 A | 8/1995 | Backaus et al. |
| 5,448,625 A | 9/1995 | Lederman |
| 5,452,351 A | 9/1995 | Yamamoto |
| 5,479,491 A | 12/1995 | Herrero Garcia et al. |
| 5,539,809 A | 7/1996 | Mayer et al. |
| 5,557,658 A | 9/1996 | Gregorek et al. |
| 5,613,006 A | 3/1997 | Reese |
| 5,652,784 A | 7/1997 | Blen et al. |

(Continued)

FOREIGN PATENT DOCUMENTS

EP     0 946 061 A2    9/1999
(Continued)

OTHER PUBLICATIONS

Declaration of Scott Wolmuth with attached Exhibit A entitled "Project Description Business Plan for Start Up Funding," posted to Elance.com (May 30, 2001).

(Continued)

*Primary Examiner* — Quynh Nguyen
(74) *Attorney, Agent, or Firm* — DLA Piper LLP US

(57) ABSTRACT

The current invention is a system for providing directory assistance service in which a user sends a request to the system and the system will, based on the request, return advertisements, which may be in a visible or audible form. The advertisements are selected from a databank, which may include any number advertisements categorized within the category associated with the service, according to selection criteria. After the advertising announcement is completed, the directory assistance call is processed as usual.

35 Claims, 6 Drawing Sheets

U.S. PATENT DOCUMENTS

| | | |
|---|---|---|
| 5,689,547 A | 11/1997 | Mölne |
| 5,724,521 A | 3/1998 | Dedrick |
| 5,764,731 A | 6/1998 | Yablon |
| 5,794,210 A | 8/1998 | Goldhaber et al. |
| 5,838,314 A | 11/1998 | Neel |
| 5,850,433 A | 12/1998 | Rondeau |
| 5,852,775 A | 12/1998 | Hidary |
| 5,873,032 A | 2/1999 | Cox et al. |
| 5,909,670 A | 6/1999 | Trader et al. |
| 5,926,754 A | 7/1999 | Cirelli et al. |
| 5,937,037 A | 8/1999 | Kamel et al. |
| 6,009,150 A | 12/1999 | Kamel |
| 6,078,866 A | 6/2000 | Buck et al. |
| 6,118,862 A | 9/2000 | Dorfman et al. |
| 6,178,231 B1 | 1/2001 | Nabkel |
| 6,212,262 B1 | 4/2001 | Kamel |
| 6,269,336 B1 | 7/2001 | Ladd et al. |
| 6,269,337 B1 | 7/2001 | Desmond et al. |
| 6,269,361 B1 | 7/2001 | Davis et al. |
| 6,301,342 B1 | 10/2001 | Ander et al. |
| 6,385,308 B1 | 5/2002 | Cohen et al. |
| 6,385,592 B1 | 5/2002 | Angles |
| 6,404,877 B1 | 6/2002 | Bolduc et al. |
| 6,434,398 B1 | 8/2002 | Inselberg |
| 6,473,612 B1 | 10/2002 | Cox et al. |
| 6,493,437 B1 | 12/2002 | Olshansky |
| 6,526,135 B1 | 2/2003 | Paxson |
| 6,553,113 B1 | 4/2003 | Dhir et al. |
| 6,570,974 B1 | 5/2003 | Gerszberg |
| 6,577,714 B1 | 6/2003 | Darcie et al. |
| 6,601,041 B1 | 7/2003 | Brown et al. |
| 6,603,844 B1 | 8/2003 | Chavez, Jr. et al. |
| 6,614,896 B1 | 9/2003 | Rao |
| 6,618,474 B1 | 9/2003 | Reese |
| 6,628,772 B1 | 9/2003 | McGrath et al. |
| 6,647,257 B2 | 11/2003 | Owensby |
| 6,658,093 B1 | 12/2003 | Langseth et al. |
| 6,658,389 B1 | 12/2003 | Alpdemir |
| 6,718,551 B1 | 4/2004 | Swix et al. |
| 6,731,625 B1 | 5/2004 | Eastep et al. |
| 6,775,371 B2 | 8/2004 | Elsey et al. |
| 6,826,559 B1 | 11/2004 | Ponte |
| 6,856,673 B1 | 2/2005 | Banks |
| 6,937,708 B2 | 8/2005 | Hirose |
| 6,947,531 B1 | 9/2005 | Lewis et al. |
| 6,956,933 B2 | 10/2005 | Virag et al. |
| 6,970,548 B2 | 11/2005 | Pines et al. |
| 6,985,567 B2 | 1/2006 | Vallinen et al. |
| 6,985,569 B2 | 1/2006 | Baker |
| 6,996,413 B2 | 2/2006 | Inselberg |
| 6,996,531 B2 | 2/2006 | Korall et al. |
| 7,023,969 B2 | 4/2006 | Pines et al. |
| 7,047,242 B1 | 5/2006 | Ponte |
| 7,113,571 B2 | 9/2006 | Matsubara et al. |
| 7,158,621 B2 | 1/2007 | Bayne |
| 7,206,391 B2 | 4/2007 | Chiu |
| 7,212,615 B2 | 5/2007 | Wolmuth |
| 7,400,711 B1 * | 7/2008 | Ford et al. ............... 379/70 |
| 7,596,218 B2 | 9/2009 | Montemer |
| 7,702,084 B2 | 4/2010 | Wolmuth |
| 7,865,457 B2 | 1/2011 | Ravin |
| 2001/0022788 A1 | 9/2001 | Matsubara |
| 2001/0049677 A1 | 12/2001 | Talib |
| 2003/0032409 A1 | 2/2003 | Hutcheson et al. |
| 2003/0078928 A1 | 4/2003 | Dorosario |
| 2003/0125958 A1 | 7/2003 | Alpdemir |
| 2003/0223563 A1 | 12/2003 | Wolmuth |
| 2004/0024846 A1 | 2/2004 | Randall et al. |
| 2004/0186778 A1 | 9/2004 | Margilodd |
| 2005/0222989 A1 | 10/2005 | Haveliwala |
| 2005/0228797 A1 | 10/2005 | Koningstein |
| 2005/0246174 A1 | 11/2005 | DeGolia |
| 2006/0004627 A1 | 1/2006 | Baluja |
| 2006/0015401 A1 | 1/2006 | Chu |
| 2006/0053048 A1 | 3/2006 | Tandetnik |
| 2006/0095418 A1 | 5/2006 | Anderson |
| 2006/0123014 A1 | 6/2006 | Ng |
| 2006/0171520 A1 | 8/2006 | Kliger |
| 2006/0173827 A1 | 8/2006 | Kliger |
| 2006/0173915 A1 | 8/2006 | Kliger |
| 2006/0229102 A1 | 10/2006 | Kitazoe et al. |
| 2007/0016469 A1 | 1/2007 | Bae |
| 2007/0127650 A1 | 6/2007 | Altberg |
| 2007/0242811 A1 | 10/2007 | Wolmuth |
| 2007/0248222 A1 | 10/2007 | Wolmuth |
| 2007/0263799 A1 | 11/2007 | Wolmuth |
| 2007/0274476 A1 | 11/2007 | Wolmuth |
| 2008/0081599 A1 | 4/2008 | Wolmuth |
| 2008/0081661 A1 | 4/2008 | Wolmuth |
| 2008/0084988 A1 | 4/2008 | Wolmuth |
| 2008/0091536 A1 | 4/2008 | Wolmuth |
| 2008/0154856 A1 | 6/2008 | Riise |
| 2008/0208675 A1 | 8/2008 | Wolmuth et al. |
| 2008/0212764 A1 | 9/2008 | Fukuta et al. |
| 2008/0212765 A1 | 9/2008 | Wolmuth et al. |
| 2009/0094235 A1 | 4/2009 | White et al. |

FOREIGN PATENT DOCUMENTS

| | | |
|---|---|---|
| WO | WO 2006/037218 | 4/2006 |

OTHER PUBLICATIONS

Oftel, "Telecommunications Act 1984 Provisional Order Under Section 16," Jun. 15, 1999, 6 pages.

Bryson, McDowell, et al., "The Concierge Key to Hospitality," John Wiley & Sons, Inc., 1992.

McKenzie, M., *Web Services Go Searching for Dollars: Will Consumers Accept Pay-to-Play Search Engines?*, Seybold Report on Internet Publishing, "Learning Experience: Houghton Mifflin Takes Textbook Business Online," Seybold Publications, 1998, 28 pages.

CNET News, "Engine Sells Results, Draws Fire," CNETNews.com, Jun. 21, 1996, 2 pages.

Live Deal Inc, "Form 10QSB (Quarterly Report of Financial condition)," Edgar Online, Inc., 2007, 7 pages.

PR Newswire, "Nuance and Unisys Help VMS Deliver 'Talking' Yellow Pages; Call FYI Offers Convenience with Voice-Driven Directory; VMS Plans to Deploy voice Service Nationwide in 2000," PR Newswire Association, Inc., Dec. 14, 1992, 2 pages.

"IBM Directory Assistance System Gateway Processor USER GUIDE", © International Business Machines Corporation, Sep. 1987 (Day not given), 34 pages.

"Wireless Application Protocol Forum, Product and Service Guide", WAP Forum Ltd., Mountain View, California, USA, May 1999 (Day not given), 16 pages.

Marek, S., "Directory Assistance Delivers the Numbers," Cellular/PCS; p. 20, *Wireless Week*, Nov. 18, 2002.

"GTE Offers Auto Directory-Connect Service", *TelecomWorldWire*, May 20, 1994.

Colby, R., "Hello Pages Provide Data by Telephone", *The Sunday Oregonian*, Portland, Oregon, Nov. 12, 1989.

Kosseff, J., "The Magic of Metro One", *TechNW*, Jul. 30, 2001.

"Advanced 411 Service", Cellular/PCS; p. 24; *Wireless Week*, Aug. 20, 2001.

Mendez-Wilson, D., "Starting a Mobile DA Evolution Deregulation Could Increase Competition in Growing Market", Section: Cellular/PCS; p. 24; *Wireless Week*, Apr. 15, 2002.

"Cellcom Chooses Infonxx Solution for Directory Assistance", p. 49, RCR Wireless News, Oct. 29, 2001.

Mendez-Wilson, D., "Fueling a Surge in Directory Assistance Services Expected to Drive Wireless Subscriber Growth, Reduce Churn", Section Cellular/PCS; p. 20, *Wireless Week*, Jan. 21, 2002.

"Bits" Section Departments; Service Providers, p. 10; *Wireless Week*, Aug. 1, 2003.

Meyer, D. et al. "Directory Provider Bruised by Spring PCS, Cingular Disconnects", p. 14, *RCR Wireless News*, Oct. 28, 2002.

Bourrie, S.R., "Taking Directory Assistance to the Next Level" Section Business/Finance, p. 27; *Wireless Week*, Jun. 19, 2000.

"Briefs", Section Business/Finance, p. 18; *Wireless Week*, Jan. 14, 2002.

"Bits", Section Departments/Service Providers; p. 10; *Wireless Week*, Feb. 1, 2003.

"Bits", Section Departments/Service Providers; p. 12; *Wireless Week*, Feb. 15, 2003.

International Search Report and Written Opinion issued in PCT/US05/43251 on Jul. 5, 2006.
U.S. Appl. No. 10/063,990.
U.S. Appl. No. 11/728,187.
U.S. Appl. No. 11/728,261.
U.S. Appl. No. 11/728,188.
U.S. Appl. No. 11/728,189.
U.S. Appl. No. 11/897,264.
U.S. Appl. No. 11/897,249.
U.S. Appl. No. 11/897,263.
U.S. Appl. No. 11/981,520.
U.S. Appl. No. 11/981,684.
U.S. Appl. No. 12/284,722.
U.S. Appl. No. 11/289,766.
U.S. Appl. No. 11/290,148.
U.S. Appl. No. 11/291,094.
International Search Report issued in PCT/US08/11067 on Dec. 1, 2008.
International Preliminary Report on Patentability issued in PCT/US08/11067 on Mar. 24, 2010.

* cited by examiner

SIC Division Structure

A. Division A: Agriculture, Forestry, and Fishing
   - Major Group 01: Agriculture Production Crops
   - Major Group 02: Agricultural Production Livestock And Animal Specialities
   - Major Group 07: Agricultural Services
   - Major Group 08: Forestry
   - Major Group 09: Fishing, Hunting, and Trapping B. Division B: Mining
   - Major Group 10: Metal Mining
   - Major Group 12: Coal Mining
   - Major Group 13: Oil And Gas Extraction
   - Major Group 14: Mining And Quarrying Of Nonmetallic Minerals, Except Fuels C. Division C: Construction
   - Major Group 15: Building Construction General Contractors And Operative Builders

FIG. 3

SIC Major Group 58

Major Group 58: Eating And Drinking Places

Major Group Structure

This major group includes retail establishments selling prepared foods and drinks for consumption on the premises; and also lunch counters and refreshment stands selling prepared foods and drinks for immediate consumption. Restaurants, lunch counters, and drinking places operated as a subordinate service facility by other establishments are not included in this industry, unless they are operated as leased departments by outside operators. Thus, restaurants and lunch counters operated by hotels are classified in Services, Major Group 70; those operated by department stores in Major Group 53. Bars and restaurants owned and operated for members of civic, social, and fraternal associations only are classified in Industry 8641. Mobile food and dairy wagons are classified in Industry 5963.

- Industry Group 581: Eating And Drinking Places
  - ◯ 5812 Eating Places
  - ◯ 5813 Drinking Places (Alcoholic Beverages)

FIG. 4

DIRECTORY ASSISTANCE WITH DATA PROCESSING STATION

RELATED APPLICATION(S)

This application is a continuation of U.S. application Ser. No. 11/728,189, filed Mar. 23, 2007, which is a continuation of U.S. application Ser. No. 10/063,990, filed May 31, 2002, now issued as U.S. Pat. No. 7,212,615. The entire teachings of the above application(s) are incorporated herein by reference.

BACKGROUND OF THE INVENTION

1. Field of the Invention

This invention relates to systems for providing telephone toll services such as, but not limited to, directory assistance or long-distance calling.

2. Description of Prior Art

The need for phone customers to locate the name, address and number of businesses such as airlines, floral shops and auto repair shops has been around for almost as long as the phone has been in existence.

Currently most phone systems charge extra for the look up of the names and addresses and numbers of general or specific businesses. This can get to be costly and many telephone customers find such directory assistance charges to be excessive.

There is also a current need for many businesses to market to a wide pool of consumers with targeted advertisement. This can be done efficiently through the use of SIC codes or "Standard Industry Codes." By knowing exactly what a particular consumer is looking for at that particular moment a company can target their scope of interest with an ad.

The use of advertisements within a telephone system is well known in the art. U.S. Pat. No. 4,850,007 by Marino is for a "Telephone toll service with advertising". It is a system for providing an economical telephone toll service in which a telephone subscriber selects the economical service by, for example, sending an appropriate signal, and then dials his directory assistance call or other telephone toll call. After the caller's options are determined, and typically before signaling for the call is commenced, a recorded-announcement of an aural or visual nature is connected to the subscriber's line, with the announcement consisting of at least one advertisement. The advertisements are selected from a databank according to some predetermined technique of selection, which may include any number of factors or features to make the service attractive to subscribers and of a nature to make the service also sufficiently rewarding to advertisers. The advertisement is not however, tied to the caller's specific interests or SIC code based on the number dialed.

U.S. Pat. No. 5,448,625 by Lederman is a "Telephone advertising method and apparatus." It is a method and apparatus for routing a telephone call through a telephone network from a caller to a called party designated by the caller via advertising service apparatus that operates in two modes successively, the parties being in communication with each other in one mode and ads are selected from storage during that mode and the ads are impressed on one or both of the parties during a different mode. Selection of ad messages for use is controlled by many criteria. Delivery of the advertisements is recorded for accounting purposes. The modes may alternate between message intervals whose duration is determined by ad message length and communication intervals whose length is determined by a talking time timer. Still there is a need for better selection criteria.

U.S. Pat. No. 5,852,775 by Hidary is a "Cellular telephone advertising system." It discloses a cellular telephone system, which is provided with an ad server and a memory for holding various commercial messages. The messages are either generic or are tailored for specific demographically selected subscribers or geographic cells. When communication is established either between a subscriber or a nonsubscriber, at least one of them receives either a generic or a specific commercial message. These advertisements are not geared to the needs of a particular caller.

U.S. Pat. No. 5,652,784 by Blen is an "Automatic telephone advertising provided in lieu of dial-tone." This invention discloses a telephone advertising service providing a short advertising message through a telephone receiver as a telephone call is initiated. Several different messages are offered in different sets of channels, with the messages changing depending on the time of day. When a prohibit service signal is active, the subscriber line is switched directly to the telephone exchange. These messages are not targeted towards the interests of a particular caller.

There is still room for improvement within the art.

SUMMARY OF THE INVENTION

It is a general object of the present invention to have a process that allows the cross marketing of phone customers when they ask for directory assistance.

The current invention is such that if a consumer is interested in airline tickets and they are calling Directory Assistance an ad based on their interest is played to that consumer. An airline or travel related ad will have a much higher impact and be received with a much higher level of interest with this consumer than to someone who is watching the evening news and is shown an airline ad.

By knowing exactly what a particular consumer is looking for at the moment they are looking; you can target their scope of interest with an ad. Using SIC code or "Standard Industry Code" or even some other variable such as having a live operator select which ad would be appropriate does this.

The concept is to use the information obtained in the 10 second listing request to play a targeted message and offer instant access to the product or service related to that message via "live call transfer" or "press 1 to be transferred to (the advertiser) now".

For non-SIC code ads general, non-category specific ads such as "refinancing your home" or a home improvement ad can be played. These ads can be played based on the point of call. This can be done by setting up calls to be routed to a specific ad if the point of the caller's location is within a specific area code, zip code, city block or other parameter.

This would be helpful for companies like Home Depot, who might want to buy ad space in zip codes of "mostly owner occupied residences", or pay day advance stores, who might want to buy advertisement for areas which are more economically depressed.

The type of ad and when the ad is played, can be controlled to a highly specific degree.

This system involves Point of call routing which is the routing an inbound 800 number call based on the location of the caller and routing the call to any predetermined location using zip code, area code, area code and prefix or city block maps.

Ads can be bought to target specific competitor names or industry codes. They can also be bought by markets delineated by zip code, area code city block or statewide.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 3 gives an example of Division Structure of SIC codes;

FIG. 4 gives an example of a Major Group of the SIC codes;

DETAILED DESCRIPTION OF THE INVENTION

A description of example embodiments of the invention follows.

Preferred Embodiment

The preferred embodiment of the invention is a process that allows the cross marketing of phone customers asking for directory assistance.

Figure 1:
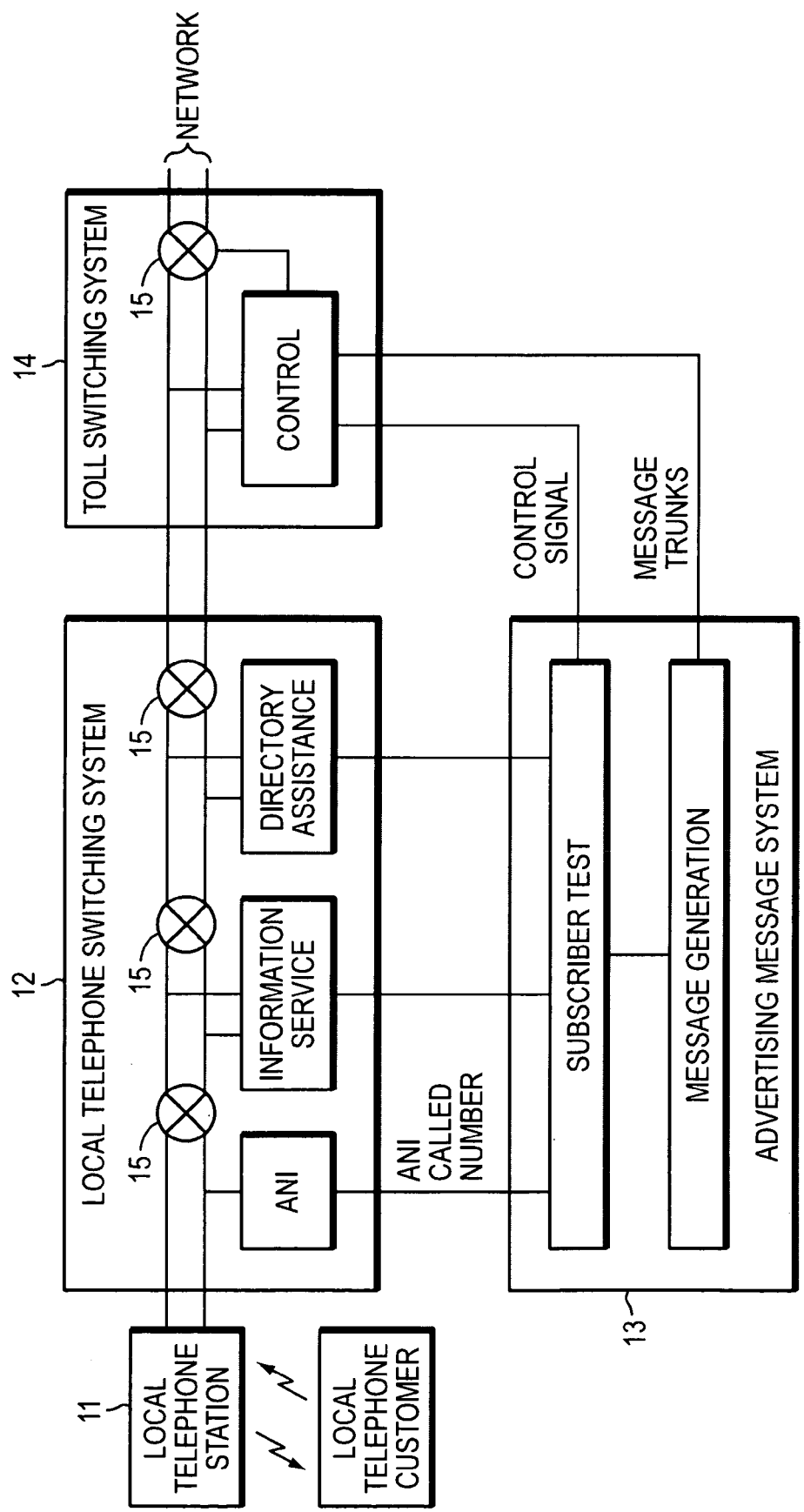
FIG. 1 is a block diagram of a telephone toll system embodying the present invention.

In FIG. 1, the local telephone station 11 is the typical telephone handset, in the usual case, and is connected by the typical local loop wires and connections to a local telephone switching system 12 which in turn connects through a toll switching system 14 to the total telephone network. Interconnected with the local telephone switching system 12 and the toll switching system 14 is the advertising message system 13 which is adapted to provide the directory assistance which has been generally summarized above.

In general, the local telephone station 11 is used by a local telephone customer, the User 10, indicated schematically.

The internal connections of the system are, in more detail, the following. The line from local telephone station 11 will be routed, through portions of switching elements 15, to the directory assistant module of the local switching system 12 if that is the nature of the customer's request, and in general, this may have been reached by dialing a specific phone number such as 1-800-Dealers.

It is anticipated that the broadest volume of use will result from long distance calling. The preferred embodiment will use a routing automatic number identification (ANI) within local telephone switching system 12, together with the subscriber test equipment in advertising message system 13, will identify the local customer in question as being one who wants to receive reduced directory assistance or long distance calling so that his incoming line will automatically be connected to advertising message system 13 before his toll call is completed.

In all of the foregoing situations identified in local telephone switching system 12, the result will be that a signal is sent to advertising message system 13 which results in a control signal being sent to toll switching system 12 to switching elements 16 to prevent the further progress of the user's call until the new features of this toll service have been provided. Therefore, at this point, the local telephone subscriber is not in contact with the larger telephone network.

In point of fact, this message may be of either an aural or visual nature, especially if the local subscriber has made available a monitor or television set connected to his telephone line. When this message ends, the control network within toll switching system 14 then removes the block on the signaling for the toll call and the call goes out over the network in the usual fashion.

The current invention is as follows if a consumer is interested in airline tickets RIGHT NOW and they are calling Directory Assistance the correct ad played to that consumer, an airline or travel related ad, will have a much higher impact and be received with a much higher level of interest than to someone who is watching the evening news and is shown an airline ad.

By knowing exactly what a particular consumer is looking for at the moment they are looking you can target their scope of interest with an ad. Using SIC code or "Standard Industry Code" or even some other variable such as having a live operator select which ad would be appropriate does this.

The concept is to use the information obtained in the 10 second listing request to play a targeted message and offer instant access to the product or service related to that message via "live call transfer" or "press 1 to be transferred to (the advertiser) now".

For non SIC code ads general, non-category specific ads such as "refinancing your home" or a home improvement ad can be played. These ads can be played based on the point of call. This can be done by setting up calls to be routed to a specific advertisement if the point of the callers location is within a specific area code, zip code, city block or other parameter.

This would be helpful for companies like Home Depot, who might want to buy ad space in zip codes of "mostly owner occupied residences" or pay day advance stores which may want to purchase advertisement for areas that are more economically depressed.

The type of ad and when the ad is played can be controlled to a highly specific degree.

In the preferred embodiment the system will use Point of call routing, which is the routing of an inbound 800 number call based on the location of the caller and connecting that caller to any predetermined location using zip code, area code, area code and prefix or city block maps.

Ads can be bought to target specific competitor names or industry codes. They can also be bought by markets delineated by zip code, area code city block or statewide.

The advertisements could also have been chosen on a random basis, or they could have been chosen to provide sufficient exposure to each of the advertisers who provided the ads for this service. In any event these advertisements will be stored in a large-scale mass memory or memory means.

In all of the foregoing versions of the service, it should be apparent that the interactive logic could be extended to make it possible for the customer to indicate, e.g., by dialing appropriate digits, that he wishes written material to be sent to him or that he wishes to talk to a salesman—now or later.

Figure 2:
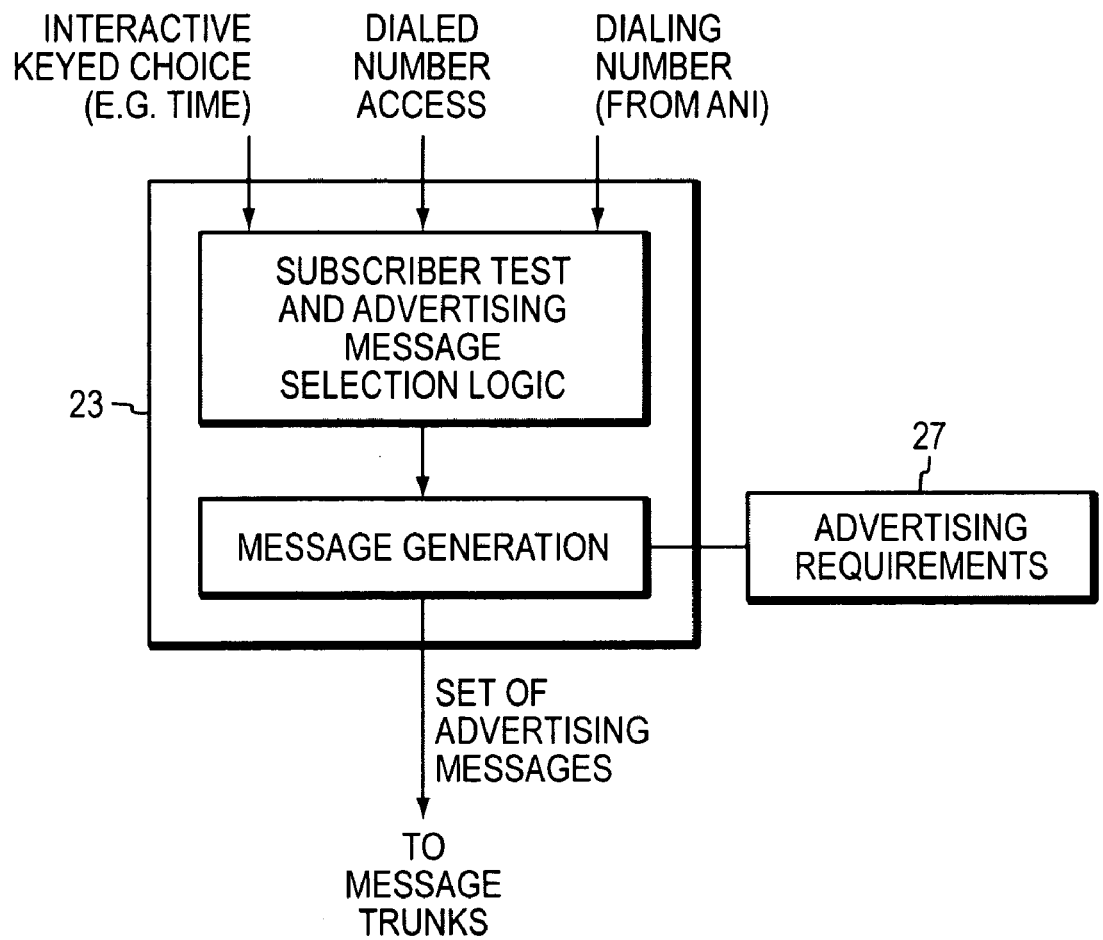
FIG. 2 shows a block diagram of parts of the system involved with selecting the type of announcement connected to a particular subscriber's line.

We have attempted to lay out in FIG. 2 a chart illustrating most of the foregoing message choice criteria in a logical manner.

We have disclosed a sample of the SIC Division Structure in FIG. 3 and the SIC Major Group 58 in FIG. 4 to display the industry standard codes that can be used in the selection process.

Figure 5:
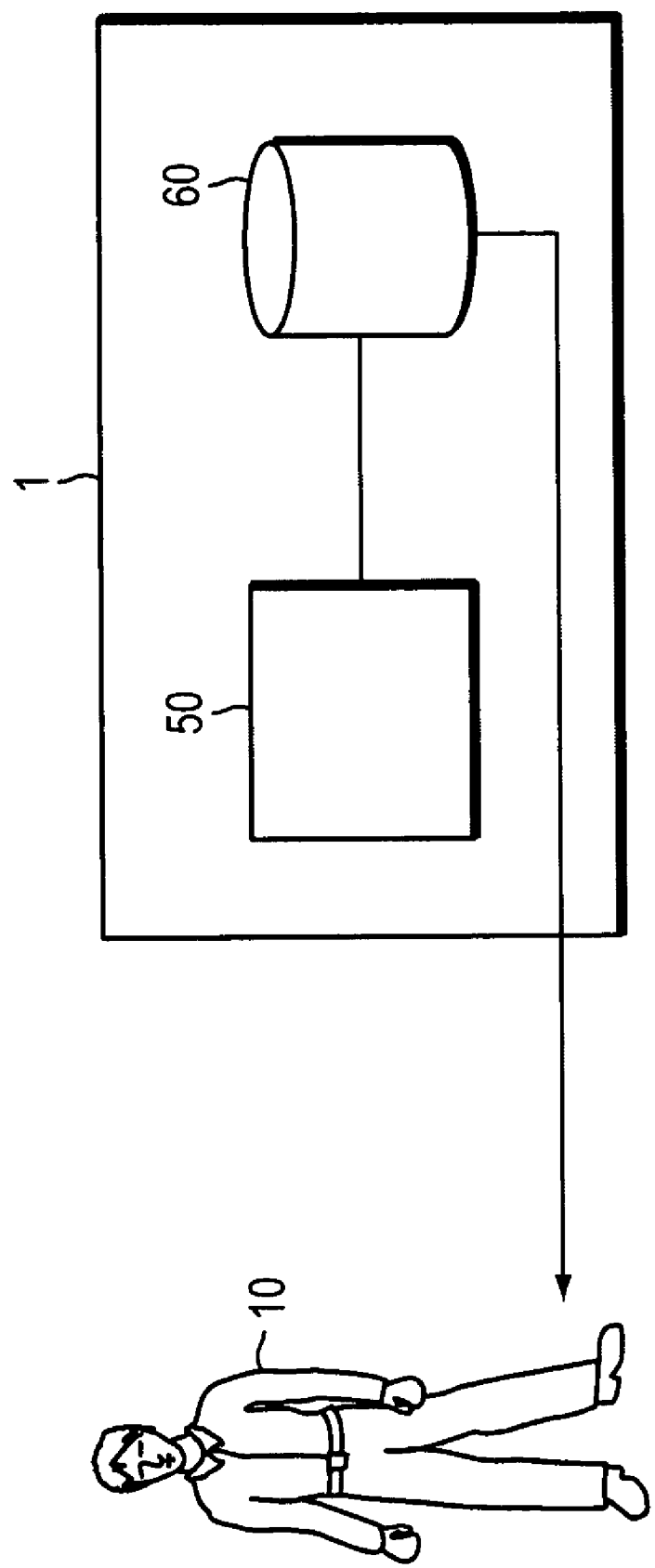
FIG. 5 is a schematic of the system.

FIG. 5 is a schematic of how system 1 works. The User 10 calls and is connected to a directory assistance number. The User 10 requests a number or a type of service or good, the system uses this as part of the selection criteria which is used by a selection means 50 such as a computer processor and selects an advertisement from the database 60 and the advertisement is played back to the User 10.

Figure 6:
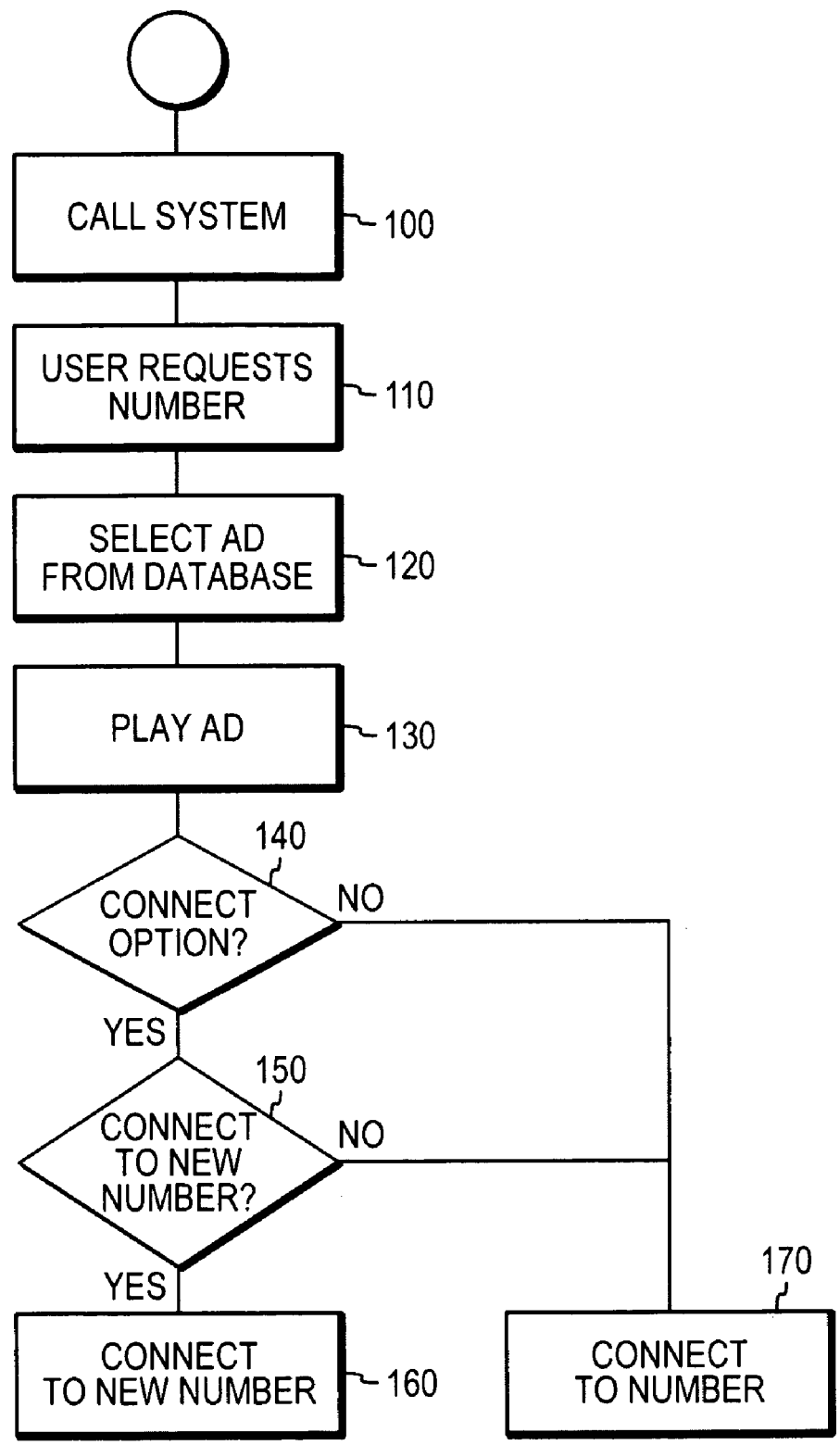
FIG. 6 gives a flowchart of the system.

FIG. 6 is a basic flowchart of the process. In Step 100, the User 10 calls the system 1. The User 10 then requests a specific number of a company or a type of goods or services in Step 110. The system 1 uses the request, along with additional information such as the locations from where call was placed and other targeting information to select an ad from the advertising database 60 in step 120. The system 1 retrieves the ad and plays it for the User 10 in step 130. In step 140, the system 1 asks "is there a connection option for this ad?" If yes, the User 10 is asked if they want to opt to be connected to the advertiser's number 150. If yes, the User 10 is connected to the advertiser's number 160. If no, the User 10 is connected to their selected number 170. If there is no connection option for this ad, the User 10 is connected to their selected number 170.

Additional Embodiment

This system could also be used in a wireless environment with Handheld PCs or an Internet or chat environment.

Advantages

The current invention provides much needed inexpensive directory assistance. The user calls a unique number for directory assistance, an operator answers that call and asks the user of his/her desired phone number, the system then uses this phone number as one of the basis for the selection criteria to select an advertisement for the system to play for the user. After the user listens to the advertisement, the system will provide the user with the desired phone number. The system may have the option for the user to select on or contact another company for the service.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method for providing directory assistance information in a public telecommunication network via a toll-free number, the method comprising:
    receiving a request for directory assistance information for a specific provider of goods or services from a customer station at a data processing station;
    examining the request for directory assistance information to identify a category associated with the specific provider of goods or services, including looking up the requested directory assistance information in a database to determine the category:
    selecting an advertisement categorized within the identified category associated with the specific provider of goods or services; and
    forwarding the selected advertisement, retrieved from a stored media, to the custom station as a short message service (SMS) text message wherein the SMS text message contains a hyperlink or other executable command to retrieve additional information regarding the specific provider of goods or services.

2. The method of claim 1, wherein the customer station is a handheld personal computer (PC).

3. The method of claim 1, wherein the request for information and/or the advertisement are provided in a wireless environment.

4. The method of claim 1, wherein the request for information and/or the advertisement are of a visual nature.

5. The method of claim 1, further comprising:
    querying a database for selecting the advertisement, the querying using as at least one query parameter derived from the examining the request for information.

6. The method of claim 1, further comprising:
    providing access to a service associated with the selected advertisement.

7. The method of claim 6, further comprising:
    connecting the customer station to a telephone number associated with the selected advertisement.

8. The method of claim 5, wherein the query parameter is a geographic location component of the specific provider of goods or services in the request for information.

9. The method of claim 5, wherein the query parameter is a name of a business that is the specific provider of goods or services.

10. The method of claim 5, wherein the query parameter is a general type of business associated with the specific provider of goods or services specified in the request for information.

11. The method of claim 5, wherein the query parameter is a description of a product or service.

12. The method of claim 5, wherein the query parameter is the telephone number associated with the specific provider associated with the request for information.

13. The method of claim 12, wherein the query parameter is a Standard Industry Classification (SIC) code associated with the telephone number associated with the specific provider.

14. The method of claim 1, wherein the selecting is performed by an operator, a machine, or a combination of operator and machine.

15. The method as in claim 1, wherein the request for information for a specific provider of goods or services does not inherently determine the category.

16. The method of claim 1, wherein examining the request for information includes examining a request provided by a data application running at the customer station.

17. The method of claim 1, wherein examining the request for information includes examining a request provided by a short message service (SMS).

18. The method of claim 1, wherein forwarding the selected advertisement includes forwarding the selected advertisement to the customer station in a form that is displayed to a customer.

19. A system for providing access to directory assistance information for a public telecommunications network via a toll-free number, the system comprising:
    a data processing station that operates to:
        receive a request for directory assistance information for a specific provider of goods or services from a customer station,
        examine the request for directory assistance information to identify a category associated with a specific provider of goods or services, including to lookup the requested directory assistance information in a database to determine the category,
        select an advertisement from a plurality of advertisements categorized within the identified category associated with the specific provider of goods or services,
        retrieve the selected advertisement from a stored media, and
        forward the selected advertisement to the customer station as a short message service (SMS) text message wherein the SMS text message contains a hyperlink or other executable command to retrieve additional information regarding the specific provider of goods or services.

20. The system of claim 19, the data processing station further comprising:
   a second receiver that operates to receive the request for directory assistance information from the customer station; and
   a processor that operates to retrieve the selected advertisement from a stored media.

21. The system of claim 19, further comprising:
   a database apparatus that operates to process a query to determine the selected advertisement, the query having at least one query parameter derived from the request for directory assistance information.

22. The system of claim 21, wherein the query parameter is a name of a business that is the specific provider of the goods or the services.

23. The system of claim 21, wherein the query parameter is a description of a good or service.

24. The system of claim 21, wherein the query parameter is the telephone number associated with the specific provider associated with the request for directory assistance information.

25. The system of claim 24, wherein the query parameter is a SIC code associated with the telephone number associated with the specific provider.

26. The system of claim 21, wherein the processing station further selects the advertisement based on a telephone number requested by the user.

27. The system of claim 19, wherein the customer station is a handheld PC.

28. The method of claim 19, wherein the request for information and/or the advertisement are provided in a wireless environment.

29. The method of claim 19, wherein the request for information and/or the advertisement are of a visual nature.

30. The system of claim 19, wherein the call processing station further provides access to a service associated with the selected advertisement.

31. The system of claim 30, wherein the customer station is selectively connected to a telephone number associated with the selected advertisement.

32. The system of claim 31, wherein the customer station is connected to the service provider associated with the selected advertisement only after prompting a user.

33. The system of claim 19, wherein the customer station is selectively connected to a telephone number for the specific provider associated with the request for information.

34. The system of claim 19, wherein the data processing station is configured to enable the advertisement to be selected by an operator, a machine, or a combination of operator and machine.

35. The system of claim 19, wherein the request for directory assistance information does not inherently determine the category.

* * * * *